United States Patent
Moon

(10) Patent No.: US 9,485,441 B2
(45) Date of Patent: Nov. 1, 2016

(54) IMAGE SENSOR AND CAMERA APPARATUS HAVING THE SAME

(71) Applicant: LG INNOTEK CO., LTD., Seoul (KR)

(72) Inventor: Young Seop Moon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/421,960

(22) PCT Filed: Jul. 5, 2013

(86) PCT No.: PCT/KR2013/006013
§ 371 (c)(1),
(2) Date: Feb. 16, 2015

(87) PCT Pub. No.: WO2014/027753
PCT Pub. Date: Feb. 20, 2014

(65) Prior Publication Data
US 2015/0222832 A1   Aug. 6, 2015

(30) Foreign Application Priority Data
Aug. 16, 2012  (KR) .......................... 10-2012-0089621

(51) Int. Cl.
*H04N 5/369*   (2011.01)
*H04N 5/33*    (2006.01)
*H04N 13/02*   (2006.01)
*H04N 9/04*    (2006.01)

(52) U.S. Cl.
CPC ............. *H04N 5/369* (2013.01); *H04N 5/332* (2013.01); *H04N 5/3696* (2013.01); *H04N 9/045* (2013.01); *H04N 13/026* (2013.01); *H04N 13/0257* (2013.01); *H04N 5/33* (2013.01)

(58) Field of Classification Search
CPC ........... H04N 5/3696; H04N 13/0257; H04N 13/026; H04N 5/369; H04N 2209/047; H01L 27/14621; H01L 27/14647
See application file for complete search history.

(56) References Cited

U.S. PATENT DOCUMENTS

| | | |
|---|---|---|
| 2002/0101524 A1 | 8/2002 | Acharya |
| 2004/0169749 A1* | 9/2004 | Acharya .................. H04N 5/33 348/279 |
| 2006/0268134 A1 | 11/2006 | Chen et al. |
| 2008/0079748 A1 | 4/2008 | Phan |
| 2010/0033611 A1 | 2/2010 | Lee et al. |
| 2010/0141771 A1* | 6/2010 | Hu .................... H01L 27/14621 348/164 |
| 2010/0157091 A1* | 6/2010 | Honda .............. H01L 27/14645 348/223.1 |

OTHER PUBLICATIONS

International Search Report in International Application No. PCT/KR2013/006013, filed Jul. 5, 2013.

* cited by examiner

*Primary Examiner* — Ahmed A Berhan
(74) *Attorney, Agent, or Firm* — Saliwanchik, Lloyd & Eisenschenk

(57) ABSTRACT

Disclosed are an image sensor and a camera apparatus having the same. The image sensor includes first to fourth color pixel patterns. Each of the first and fourth color pixel patterns includes a plurality of color pixels, and each of the second and third color pixel patterns includes one of a red pixel and a blue pixel. The camera apparatus not only reproduces 3D image data, but also realize high resolution.

14 Claims, 2 Drawing Sheets

IMAGE SENSOR AND CAMERA APPARATUS HAVING THE SAME

CROSS-REFERENCE TO RELATED APPLICATIONS

This application is the U.S. national stage application of International Patent Application No. PCT/KR2013/006013, filed Jul. 5, 2013, which claims priority to Korean Application No. 10-2012-0089621, filed Aug. 16, 2012, the disclosures of each of which are incorporated herein by reference in their entirety.

TECHNICAL FIELD

The embodiment relates to an image sensor and a camera apparatus having the same. In particular, the embodiment relates to an image sensor having a plurality of color pixel patterns arranged in rows and columns, and a camera apparatus having the same.

BACKGROUND ART

In general, an image sensor includes a plurality of color pixel patterns. In this case, in the image sensor, the color pixel patterns are arranged in the form of a lattice. In addition, the image sensor detects color information from an optical signal through the color pixel patterns. Accordingly, the camera apparatus having the image sensor mounted therein can process image data corresponding to the optical signal.

However, the camera apparatus has a difficulty when reproducing 3D image data by using the image sensor. In addition, the camera apparatus has a difficulty when realizing high resolution by using the image sensor.

DISCLOSURE OF INVENTION

Technical Problem

The embodiment provides an image sensor and a camera apparatus, capable of not only reproducing 3D image data, but also realizing high resolution.

Solution to Problem

According to the embodiment, there is provided an image sensor. The image sensor includes a first color pixel pattern, a second color pixel pattern, a third color pixel pattern, and a fourth color pixel pattern.

In this case, according to the image sensor of the embodiment, each of the first and fourth color pixel patterns includes a plurality of color pixels.

In addition, according to the image sensor of the embodiment, each of the second and third color pixel patterns includes one of a red pixel and a blue pixel.

Meanwhile, according to the embodiment, there is provided a camera apparatus. The camera apparatus includes an optical module to receive an optical signal, an image sensor to detect color information from the optical signal, and an image processing module to process image data by using the color information.

In this case, according to the camera apparatus of the embodiment, the image sensor includes a first color pixel pattern, a second color pixel pattern, a third color pixel pattern, and a fourth color pixel pattern.

In this case, according to the camera apparatus of the embodiment, each of the first and fourth color pixel patterns includes a plurality of color pixels.

In addition, according to the camera apparatus of the embodiment, each of the second and third color pixel patterns includes one of red and blue pixels.

Advantageous Effects of Invention

According to the image sensor and the camera apparatus having the same of the embodiment, as the first and fourth color pixel patterns include a plurality of color pixels, the camera apparatus can more effectively extract a depth map. In addition, as the second and third color pixel patterns have the single structures, the camera apparatus can realize high resolution. Accordingly, the camera apparatus cannot only reproduce 3D image data by using the depth map, but also realize the high resolution.

MODE FOR THE INVENTION

Figure 1:
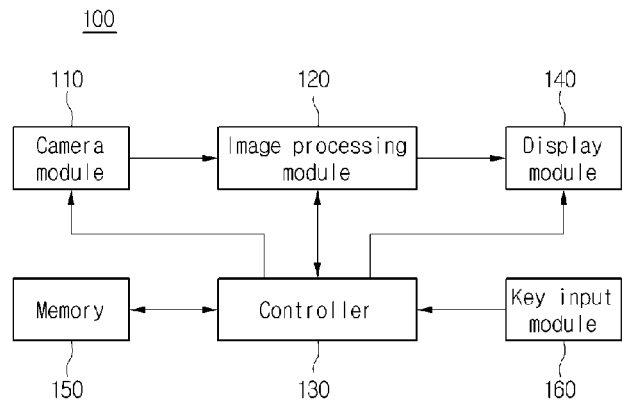
FIG. 1 is a block diagram schematically showing a camera apparatus according to the embodiment.

Hereinafter, embodiments will be described in more detail with reference to accompanying drawings. In this case, the same elements will be assigned with the same reference numerals. In addition, the details of the generally known function and structure, which make the subject matter of the embodiment unclear, will be omitted.

Figure 2:
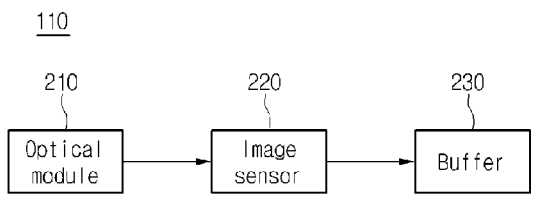
FIG. 2 is a block diagram showing the detailed structure of a camera module of FIG. 1.
Figure 3:
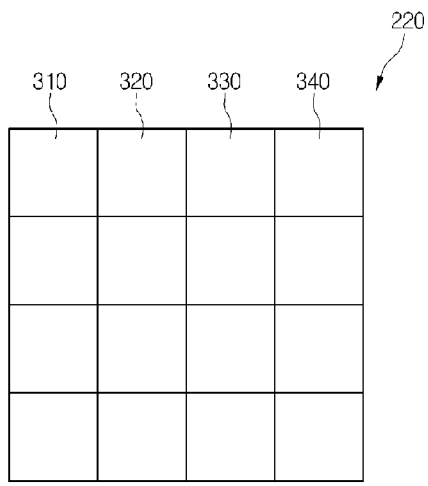
FIG. 3 is a plan view schematically showing the structure of an image sensor of FIG. 2.
Figure 4:
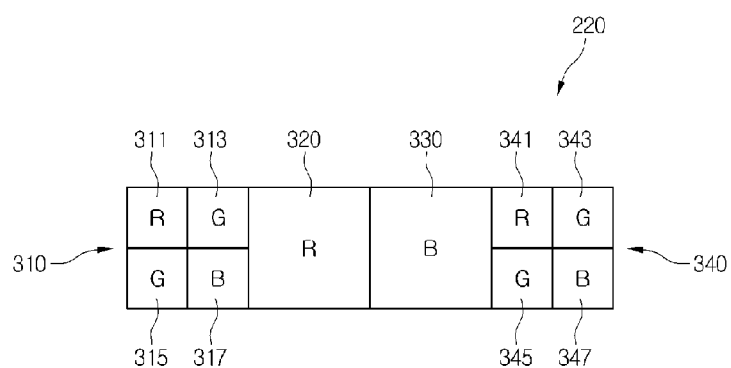
FIG. 4 is a view showing the first example of the image sensor shown in FIG. 3.
Figure 5:
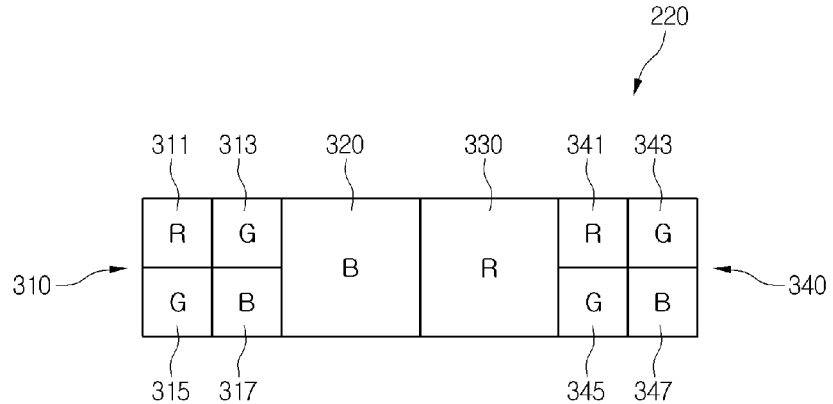
FIG. 5 is a view showing the second example of the image sensor shown in FIG. 3.

FIG. 1 is a block diagram schematically showing a camera apparatus according to the embodiment, FIG. 2 is a block diagram showing the detailed structure of a camera module of FIG. 1, and FIG. 3 is a plan view schematically showing the structure of an image sensor of FIG. 2. FIGS. 4 and 5 are views showing examples of the image sensor shown in FIG. 3. FIG. 4 is a view showing the first example of the image sensor shown in FIG. 3, and FIG. 5 is a view showing the second example of the image sensor shown in FIG. 3.

Referring to FIG. 1, a camera apparatus 100 according to the embodiment includes a camera module 110, an image processing module 120, a controller 130, a display module 140, a memory 150, and a key input module 160.

The camera module 110 photographs image data. As shown in FIG. 2, the camera module 110 includes an optical module 210, an image sensor 220, and a buffer 230.

The optical module 210 receives an optical signal. The optical module 210 includes a lens and a lens adjusting module.

The image sensor 230 converts the optical signal into an electrical signal, and converts an analog image signal into digital data. In this case, the image sensor 230 detects color information from the optical signal. In this case, the image sensor 230 is assumed as a CCD sensor or a CMOS sensor.

The image sensor 230 includes a plurality of color pixel patterns 310, 320, 330, and 340 as shown in FIG. 3. In this case, in the image sensor 230, the color pixel patterns 310, 320, 330, and 340 are arranged in the form of a lattice. For example, the color pixel patterns 310, 320, 330, and 340 may be arranged in the form of a 4×4 matrix. In other words, the color pixel patterns 310, 320, 330, and 340 are arranged in rows and columns. In this case, the color pixel patterns 310, 320, 330, and 340 have the same size. Further, in each row, the first to fourth color pixel patterns 310, 320, 330, and 340 are arranged as columns.

In a single row, the first to fourth color pixel patterns 310, 320, 330, and 340 may be arranged in the form shown in FIG. 4. In other words, the first to fourth color pixel patterns 310, 320, 330, and 340 may be arranged in the form of a 1×4 matrix.

The first color pixel pattern 310 includes a plurality of color pixels 311, 313, 315, and 317. In this case, the color pixels 311, 313, 315, and 317 are arranged in the form of a lattice. The first color pixel pattern 310 may have the combination structure of the color pixels 311, 313, 315, and 317. In addition, the first and second color pixels 311 and 313 are arranged as columns in the first row, and the third and fourth color pixels 315 and 317 are arranged as columns in the second row. Further, the first color pixel pattern 310 includes a green pixel (G), a red pixel (R), and a blue pixel (B).

In this case, the first color pixel 311 may be a red pixel (R), the second and third color pixels 313 and 315 may be green pixels (G), and the fourth color pixel 317 may be a blue pixel (B). That is to say, in the first color pixel pattern 310, the green pixels G may be diagonally arranged. In other words, the green pixels (G) may not be arranged adjacent to each other in the same row.

The second color pixel pattern 320 has a single structure. In this case, the second color pixel pattern 320 may include a red pixel (R).

The third color pixel pattern 330 has a single structure. In this case, the third color pixel pattern 330 may include a blue pixel (B).

The fourth color pixel pattern 340 is structured in the same manner as that of the first color pixel pattern 310. In other words, the fourth color pixel pattern 340 includes a plurality of color pixels 341, 343, 345, and 347. In this case, the color pixels 341, 343, 345, and 347 are arranged in the form of a lattice. The fourth color pixel pattern 340 may have the combination structure of the color pixels 341, 343, 345, and 347. In addition, the first and second color pixels 341 and 343 are arranged as columns in the first row, and the third and fourth color pixels 345 and 347 are arranged as column entries in the second row. Further, the fourth color pixel pattern 340 includes a green pixel (G), a red pixel (R), and a blue pixel (B).

In this case, the first color pixel 341 may be a red pixel (R), the second and third color pixels 343 and 345 may be green pixels (G), and the fourth color pixel 347 may be a blue pixel (B). That is to say, in the fourth color pixel pattern 340, the green pixels G may be diagonally arranged. In other words, the green pixels (G) may not be arranged adjacent to each other in the same row.

Meanwhile, in a single row, the first to fourth color pixel patterns 310, 320, 330, and 340 may be arranged in the form shown in FIG. 5. In other words, the first to fourth color pixel patterns 310, 320, 330, and 340 may be arranged in the form of a 1×4 matrix.

The first color pixel pattern 310 includes a plurality of color pixels 311, 313, 315, and 317. In this case, the color pixels 311, 313, 315, and 317 are arranged in the form of a lattice. The first color pixel pattern 310 may have the combination structure of the color pixels 311, 313, 315, and 317. In addition, the first and second color pixels 311 and 313 are arranged as columns in the first row, and the third and fourth color pixels 315 and 317 are arranged as columns in the second row. Further, the first color pixel pattern 310 includes a green pixel (G), a red pixel (R), and a blue pixel (B).

In this case, the first color pixel 311 may be a red pixel (R), the second and third color pixels 313 and 315 may be green pixels (G), and the fourth color pixel 317 may be a blue pixel (B). That is to say, in the first color pixel pattern 310, the green pixels G may be diagonally arranged. In other words, the green pixels (G) are not arranged adjacent to each other in the same row.

The second color pixel pattern 320 has a single structure. In this case, the second color pixel pattern 320 may include a blue pixel (B).

The third color pixel pattern 330 has a single structure. In this case, the second color pixel pattern 330 may include a red pixel (R).

The fourth color pixel pattern 340 is structured in the same manner as the first color pixel pattern 310. In other words, the fourth color pixel pattern 340 includes a plurality of color pixels 341, 343, 345, and 347. In this case, the color pixels 341, 343, 345, and 347 are arranged in the form of a lattice. The fourth color pixel pattern 340 may have the combination structure of the color pixels 341, 343, 345, and 347. In addition, the first and second color pixels 341 and 343 are arranged as columns in the first row, and the third and fourth color pixels 345 and 347 are arranged as columns in the second row. Further, the fourth color pixel pattern 340 includes a green pixel (G), a red pixel (R), and a blue pixel (B).

In this case, the first color pixel 341 may be a red pixel (R), the second and third color pixels 343 and 345 may be green pixels (G), and the fourth color pixel 347 may be a blue pixel (B). That is to say, in the fourth color pixel pattern 340, the green pixels G may be diagonally arranged. In other words, the green pixels (G) may not be adjacent to each other in the same row.

Meanwhile, although the above examples have been described in that the second and fourth color pixels 313 and 315 of the first color pixel pattern 310 are green pixels (G), the embodiment is not limited thereto. In other words, even if the first and fourth color pixels 311 and 317 of the first color pixel pattern 310 are green pixels (G), the embodiment can be implemented. In this case, in the first color pixel pattern 310, the second color pixel 313 may be a red pixel (R), and the third color pixel 315 may be a blue pixel (B). Further, in the first color pixel pattern 310, the second color pixel 313 may be a blue pixel (B), and the third color pixel 315 may be a red pixel (R).

Meanwhile, although the above examples have been described in that the first color pixel 311 of the first color pixel pattern 310 is a red pixel (R), and the fourth color pixel 317 of the first color pixel pattern 310 is a blue pixel (B), the embodiment is not limited thereto. In other words, even if the first color pixel 311 of the first color pixel pattern 310 is a blue pixel (B), and the fourth color pixel 317 of the first color pixel pattern 310 is a red pixel (R), the embodiment can be implemented. In addition, even if at least one of the first and fourth color pixels 311 and 317 of the first color pixel pattern 310 is an infrared pixel, the embodiment can be implemented.

Meanwhile, although the above examples have been described in that the second and fourth color pixels 343 and 345 of the fourth color pixel pattern 340 are green pixels (G), the embodiment is not limited thereto. In other words, even if the first and fourth color pixels 341 and 347 of the fourth color pixel pattern 340 are green pixels (G), the embodiment can be implemented. In this case, in the fourth color pixel pattern 340, the second color pixel 343 may be a red pixel (R), and the third color pixel 345 may be a blue pixel (B). Further, in the first color pixel pattern 340, the second color pixel 343 may be a blue pixel (B), and the third color pixel 345 may be a red pixel (R).

Meanwhile, although the above examples have been described in that the fourth color pixel 341 of the fourth color pixel pattern 340 is a red pixel (R), and the fourth color pixel 347 of the fourth color pixel pattern 340 is a blue pixel (B), the embodiment is not limited thereto. In other words, even if the first color pixel 341 of the fourth color pixel pattern 340 is a blue pixel (B), and the fourth color pixel 347 of the fourth color pixel pattern 340 is a red pixel (R), the embodiment can be implemented. In addition, even if at least one of the first and fourth color pixels 341 and 347 of the fourth color pixel pattern 340 is an infrared pixel, the embodiment can be implemented.

Meanwhile, although the above examples have been described in that the first and fourth color pixel patterns 310 and 340 have the same structure, the embodiment is not limited thereto. In other words, even if the first and fourth color pixel patterns 310 and 340 have structures symmetrical to each other, the embodiment can be implemented. In this case, the second and third color pixels 313 and 315 of the first color pixel pattern 310 may be green pixels G, and the first and fourth color pixels 341 and 347 of the fourth color pixel pattern 340 may be green pixels G. In addition, the first and fourth color pixels 311 and 317 of the first color pixel pattern 310 may be green pixels G, and the second and third color pixels 343 and 345 of the fourth color pixel pattern 340 may be green pixels G.

The buffer 230 stores the color information. In this case, the buffer 117 stores color information corresponding to each of the first to fourth color pixel patterns 310, 320, 330, and 340. In this case, the buffer 230 stores color information corresponding to each of the color pixels 311, 313, 315, and 317 corresponding to the first color pixel pattern 310. In addition, the buffer 230 stores color information corresponding to each of the color pixels 341, 343, 345, and 347 corresponding to the fourth color pixel pattern 340.

The image processing module 120 processes image data by using the color information. In this case, the image processing module 120 extracts 2D image data by using the color information of the first to fourth color pixel patterns 310, 320, 330, and 340. In other words, the image processing module 120 extracts green information for the image data from the color information of the first and fourth color pixel patterns 310 and 340. In addition, the image processing module 120 extracts red and blue information for the image data from the color information of the second and third color pixel patterns 320 and 330.

In this case, the image processing module 120 extracts the green information corresponding to the green pixel G of the first and fourth color pixel patterns 310 and 340. In addition, the image processing module 120 extracts the red information corresponding to the red pixel R of the second color pixel pattern 320 or the third color pixel pattern 330. In addition, the image processing module 120 extracts the blue information corresponding to the blue pixel B of the second color pixel pattern 320 or the third color pixel pattern 330.

The image processing module 120 extracts a depth map by using the color information of the first and fourth color pixel patterns 310 and 340. In this case, the depth map represents a 3D effect of image data. The image processing module 120 detects the 3D effect of image data corresponding to the first and fourth color pixel patterns 310 and 340. For example, the image processing module 120 may measure the optical intensity of an infrared wavelength based on the color information of the first color pixel pattern 310. In addition, the image processing module 120 may measure the optical intensity of an infrared wavelength based on the color information of the fourth color pixel pattern 340. Further, the image processing module 120 may measure the depth map corresponding to the first and fourth color pixel patterns 310 and 340 by comparing the optical intensities with each other.

Further, the image processing module 120 generates screen image data to display image data. In this case, the image processing module 120 processes the image data in the unit of a frame, and outputs the image data suitably for the characteristic and the size of the display module 130. The image processing module 120 reproduces 3D image data by applying the depth map to 2D image data. Besides, the image processing module 120 includes an image CODEC to compress image data according to a set scheme or recover the compressed image data to original image data. The image CODEC may include a JPEG CODEC, an MPEG4 CODEC, or a wavelet CODEC.

The controller 130 controls the overall operation of the camera apparatus 100. The controller 130 performs a photographing mode. The controller 130 activates the camera module 110, the image processing module 120, and the display module 140. The controller 130 controls the camera module 110 to detect color information corresponding to an optical signal. In addition, the controller 130 controls the image processing module 120 to process image data by using the color information. In this case, the controller 130 controls the image processing module 120 to extract the 2D image data and a depth map. Besides, the controller 130 controls the image processing module 120 to apply the depth map to the 2D image data, so that 3D image data can be reproduced. In addition, the controller 130 controls the display module 140 to display image data in 3D.

The display module 140 displays screen image data output from the image processing module 120 and displays user data output from the controller 130. The display module 140 may use a liquid crystal display (LCD). In this case, the display module 140 may include an LCD controller, an LCD memory to store image data, and an LCD display device. When the LCD is realized in a touch screen scheme, the LCD may serve as an input module.

The memory 150 includes a program memory and a data memory. The program memory stores the operating program of the camera apparatus 100. In this case, the program memory stores programs to process 3D image data. The data memory stores data generated in the process of executing the programs. The memory 150 may store the 3D image data under the control of the controller 130.

The key input module 160 includes keys to set or execute various functions.

Figure 6:
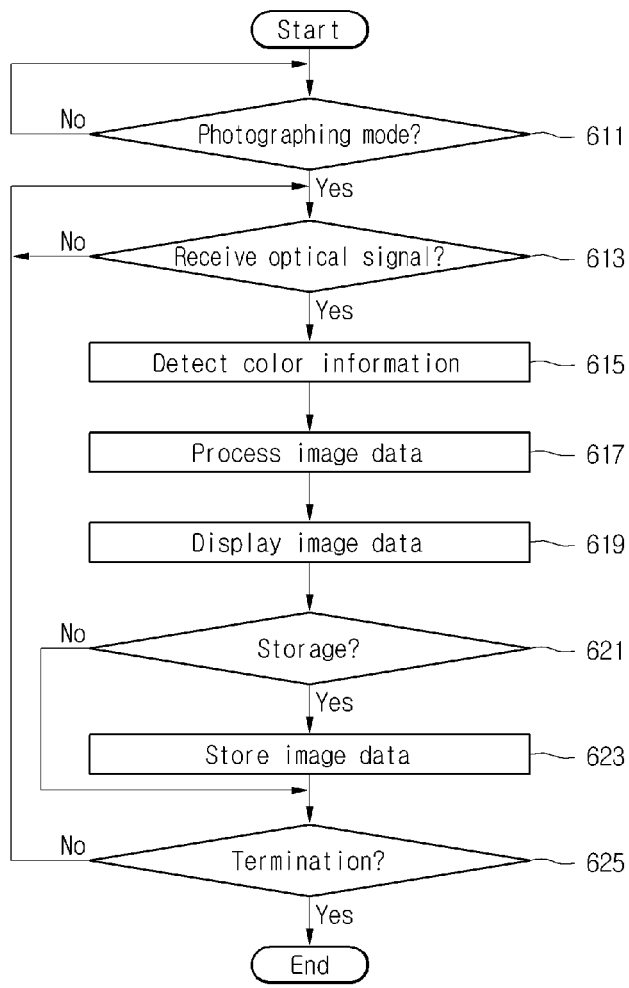
FIG. 6 is a flowchart showing the operating procedure of the camera apparatus according to the embodiment.

FIG. 6 is a flowchart showing the operating procedure of the camera apparatus according to the embodiment.

Referring to FIG. 6, the operating procedure of the camera apparatus 100 according to the present embodiment starts from that the controller 130 detects the photographing mode in step 611. In this case, if the execution of the photographing mode is requested through the key input module 160, the controller 130 may detect the request for the execution of the photographing mode and execute the photographing mode. In this case, at the photographing mode, the camera module 110, the image processing module 120, and the display module 140 are activated.

Next, if the optical signal is received from the optical module 210, the image sensor 220 detects the reception of the optical signal in step 613. Next, the image sensor 220 detects color information from the optical signal in step 615. In this case, the image sensor 220 may have the above structure.

That is to say, in the image sensor 220, the plural color pixel patterns 310, 320, 330, and 340 are arranged in rows and columns. In addition, a plurality of first to fourth color pixel patterns 310, 320, 330, and 340 are provided in rows and columns. In addition, the first and fourth color pixel patterns 310 and 340 include the plural color pixels 311, 313, 315, 317, 341, 343, 345, and 347. The color pixels 311, 313, 315, 317, 341, 343, 345, and 347 may include a green pixel (G), a red pixel (R), and a blue pixel (B). Further, the second and third color pixel patterns 320 and 330 have single structures. In this case, the second and third color pixel patterns 320 and 330 may be different from each other and may have a red pixel (R) or a blue pixel (B).

Thereafter, the image processing module 120 processes image data by using color information in step 617. In this case, the image processing module 120 extracts 2D image data by using color information of the color pixel patterns 310, 320, 330, and 340. In other words, the image processing module 120 extracts green information for the image data from the color information of the first and fourth color pixel patterns 310 and 340. In addition, the image processing module 120 extracts red and blue information for the image data from the color information of the second and third color pixel patterns 320 and 330. In addition, the image processing module 120 extracts a depth map by using the color information of the first and fourth color pixel patterns 310 and 340. Next, the image processing module 120 reproduces 3D image data by applying the depth map to the 2D image data.

Next, the controller 130 displays the image data in step 619. In this case, the controller 130 controls the display module 140 to display the image data in the 3D.

Thereafter, the controller 130 determines if the image data are stored in step 621. In this case, if the storage of the image data is requested through the key input module 160 or the touch screen, the controller 130 may detect the request for the storage of the image data and make a determination to store the image data. In addition, the controller 130 may make a determination to store the image data according to presetting. In addition, if the request for the storage of the image data is not detected or not preset, the controller 130 may make a determination that the image data need not be stored.

Subsequently, if the determination to store the image data is made in step 621, the controller 130 stores the image data in the memory 150 in step 623. In this case, the controller 130 may store 2D image data and a depth map corresponding thereto by matching the 2D image data and the depth map with each other. In addition, the controller 130 may store 3D image data.

Finally, if the termination of the photographing mode is requested by the key input module 160 or the touch screen, the controller 130 detects the request for the termination of the photographing mode in step 625. In this case, the controller 130 may detect the request for the termination of the photographing mode in the process of displaying the image data. In this case, the controller 130 may detect the request for the termination of the photographing mode without detecting the request for the storage of the image data. In addition, after storing the image data, the controller 130 may detect the request for the termination of the photographing mode. In addition, the controller 130 terminates the photographing mode to terminate the operating procedure of the camera apparatus 100.

Meanwhile, if the request for the termination of the photographing mode is not detected in step 625, the controller 130 may repeat steps 613 to 625. In this case, the controller 130 repeats steps 613 to 625 until the request for the termination of the photographing mode is detected.

According to the embodiment, as the first and fourth color pixel patterns 310 and 340 include the plural color pixels 311, 313, 315, 317, 341, 343, 345, and 347, the camera apparatus 100 may more efficiently extract the depth map. In addition, as the second and third color pixel patterns 320 and 330 have single structures, the high resolution can be realized in the camera apparatus 100. Accordingly, the camera apparatus 100 cannot only reproduce 3D image data by using the depth map, but also realize the high resolution.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

The invention claimed is:

1. An image sensor comprising:
a first color pixel pattern;
a second color pixel pattern;
a third color pixel pattern; and
a fourth color pixel pattern,
wherein each of the first and fourth color pixel patterns comprises a plurality of color pixels,
wherein green information is extracted from the plurality of color pixels,
wherein each of the second and third color pixel patterns comprises one of red and blue pixels, and
wherein red information is extracted from the red pixel and blue information is extracted from the blue pixel.

2. The image sensor of claim 1, wherein the first to fourth color pixel patterns are arranged as columns in a single row.

3. The image sensor of claim 1, wherein the second color pixel pattern is different from the third color pixel pattern.

4. The image sensor of claim 1, wherein two of the plurality of color pixels are green pixels.

5. The image sensor of claim 4, wherein remaining color pixels comprise at least one of red, blue, and infrared pixels.

6. The image sensor of claim 4, wherein the plurality of color pixels are arranged in a form of a lattice, and wherein the green pixels are diagonally arranged.

7. The image sensor of claim 1, wherein the first color pixel pattern is a same as the fourth color pixel pattern.

8. A camera apparatus comprising:
an optical module to receive an optical signal;
an image sensor to detect color information from the optical signal; and
an image processing module to process image data by using the color information, wherein the image sensor comprises a first color pixel pattern, a second color pixel pattern, a third color pixel pattern, and a fourth color pixel pattern, wherein each of the first and fourth color pixel patterns comprises a plurality of color pixels, wherein each of the second and third color pixel patterns comprises one of red and blue pixels, and wherein the image processing module extracts green information from color information detected from the first and fourth color pixel patterns, and extracts red information and blue information from the color information detected from the second and third color pixel patterns.

9. The camera apparatus of claim 8, wherein the second color pixel pattern is different from the third color pixel pattern.

10. The camera apparatus of claim 8, wherein two of the plurality of color pixels are green pixels.

11. The camera apparatus of claim 10, wherein remaining color pixels comprise at least one of red, blue, and infrared pixels.

12. The camera apparatus of claim 10, wherein the plurality of color pixels are arranged in a form of a lattice, and wherein the green pixels are diagonally arranged.

13. The camera apparatus of claim 8, wherein the first color pixel pattern is a same as the fourth color pixel pattern.

14. The camera apparatus of claim 8, wherein the image processing module extracts a depth map by using color information detected from the first and fourth color pixel patterns.

* * * * *